(12) United States Patent
Todasco et al.

(10) Patent No.: US 11,818,140 B2
(45) Date of Patent: *Nov. 14, 2023

(54) TARGETED AUTHENTICATION QUERIES BASED ON DETECTED USER ACTIONS

(71) Applicant: PAYPAL, INC., San Jose, CA (US)

(72) Inventors: Michael Charles Todasco, Santa Clara, CA (US); Sumeet Ahuja, Milpitas, CA (US); Geetha Kuppuswamy, San Jose, CA (US); Prashanthi Ravanavarapu, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/443,644

(22) Filed: Jul. 27, 2021

(65) Prior Publication Data
US 2021/0360003 A1   Nov. 18, 2021

Related U.S. Application Data

(63) Continuation of application No. 16/405,164, filed on May 7, 2019, now Pat. No. 11,075,924, which is a continuation of application No. 15/145,728, filed on May 3, 2016, now Pat. No. 10,284,567.

(51) Int. Cl.
*H04L 9/40* (2022.01)
(52) U.S. Cl.
CPC .......... *H04L 63/123* (2013.01); *H04L 63/083* (2013.01); *H04L 63/0853* (2013.01)

(58) Field of Classification Search
CPC .. H04L 63/123; H04L 63/083; H04L 63/0853
See application file for complete search history.

(56) References Cited

U.S. PATENT DOCUMENTS

| | | | |
|---|---|---|---|
| 8,756,650 B2 | 6/2014 | Wolfson et al. | |
| 8,776,195 B1 | 7/2014 | Avni et al. | |
| 8,843,997 B1 | 9/2014 | Hare | |
| 8,955,066 B1* | 2/2015 | Ackerman | G06F 21/316 726/5 |
| 9,003,516 B2* | 4/2015 | Brown | G06Q 20/341 726/28 |
| 9,014,666 B2 | 4/2015 | Bentley et al. | |
| 9,055,063 B2 | 6/2015 | Dwan et al. | |
| 9,078,128 B2 | 7/2015 | Medina et al. | |

(Continued)

*Primary Examiner* — Viral S Lakhia
(74) *Attorney, Agent, or Firm* — Haynes and Boone, LLP

(57) ABSTRACT

There are provided systems and methods for targeted authentication queries based on detected user actions. A user may perform various actions during a day, including online, electronic, or digital actions, such as social networking, messaging, and media consumption, as well as real-life actions, such as exercise, travel, and purchases. The actions may be used to determine a user history for the user by a service provider. When the user wishes to login to an account or otherwise authenticate the identity of the user, the user may provide login or authentication credentials. The credentials may be used to look up the user history and cause the service provider to generate an authentication—query for the user based on events associated with the user in the user history. The query may be utilized to further authenticate the user by requiring the user to respond with the event associated with the user.

20 Claims, 6 Drawing Sheets

(56) References Cited

U.S. PATENT DOCUMENTS

| | | | |
|---|---|---|---|
| 9,300,658 B1* | 3/2016 | Sadacharam | H04L 63/04 |
| 9,338,156 B2 | 5/2016 | Oberheide et al. | |
| 9,391,985 B2* | 7/2016 | Hefetz | H04M 15/8033 |
| 9,516,010 B1 | 12/2016 | Avital et al. | |
| 9,584,499 B2 | 2/2017 | Nandakumar | |
| 9,660,974 B2* | 5/2017 | Grajek | H04L 67/563 |
| 9,749,331 B1* | 8/2017 | Koeten | H04L 63/0815 |
| 10,015,153 B1 | 7/2018 | Dotan et al. | |
| 10,103,878 B1 | 10/2018 | Sharifi Mehr | |
| 10,212,587 B2* | 2/2019 | Bentley | G06F 21/34 |
| 10,326,748 B1* | 6/2019 | Brisebois | G06F 21/31 |
| 10,909,539 B2 | 2/2021 | Fisher et al. | |
| 11,157,436 B2* | 10/2021 | Mistry | H04W 4/80 |
| 2003/0154406 A1 | 8/2003 | Honarvar et al. | |
| 2007/0214354 A1 | 9/2007 | Renaud | |
| 2013/0067081 A1 | 3/2013 | Liu et al. | |
| 2014/0096215 A1 | 4/2014 | Hessler | |
| 2014/0162598 A1 | 6/2014 | Villa-Real | |
| 2015/0180894 A1 | 6/2015 | Sadovsky et al. | |
| 2015/0244699 A1 | 8/2015 | Hessler | |
| 2016/0012194 A1 | 1/2016 | Prakash et al. | |
| 2016/0021105 A1* | 1/2016 | Pellom | H04L 63/105 726/7 |
| 2016/0065558 A1 | 3/2016 | Suresh et al. | |
| 2016/0094531 A1 | 3/2016 | Unnikrishnan et al. | |
| 2016/0119314 A1 | 4/2016 | Uzelac et al. | |
| 2016/0239655 A1* | 8/2016 | Sadacharam | G06F 21/42 |
| 2016/0248785 A1 | 8/2016 | Petry et al. | |
| 2016/0261616 A1* | 9/2016 | Shulman | H04L 63/10 |
| 2016/0269400 A1* | 9/2016 | Glaser | G06Q 20/3224 |
| 2016/0314211 A1 | 10/2016 | Kerai et al. | |
| 2016/0315929 A1 | 10/2016 | Childress et al. | |
| 2016/0321652 A1* | 11/2016 | Dimmick | H04L 63/083 |
| 2017/0053280 A1 | 2/2017 | Lishok et al. | |
| 2017/0063551 A1 | 3/2017 | Quinn et al. | |
| 2017/0163471 A1 | 6/2017 | Zheng | |
| 2017/0257359 A1 | 9/2017 | Ogawa | |
| 2019/0052619 A1* | 2/2019 | Huh | G06F 21/316 |

* cited by examiner

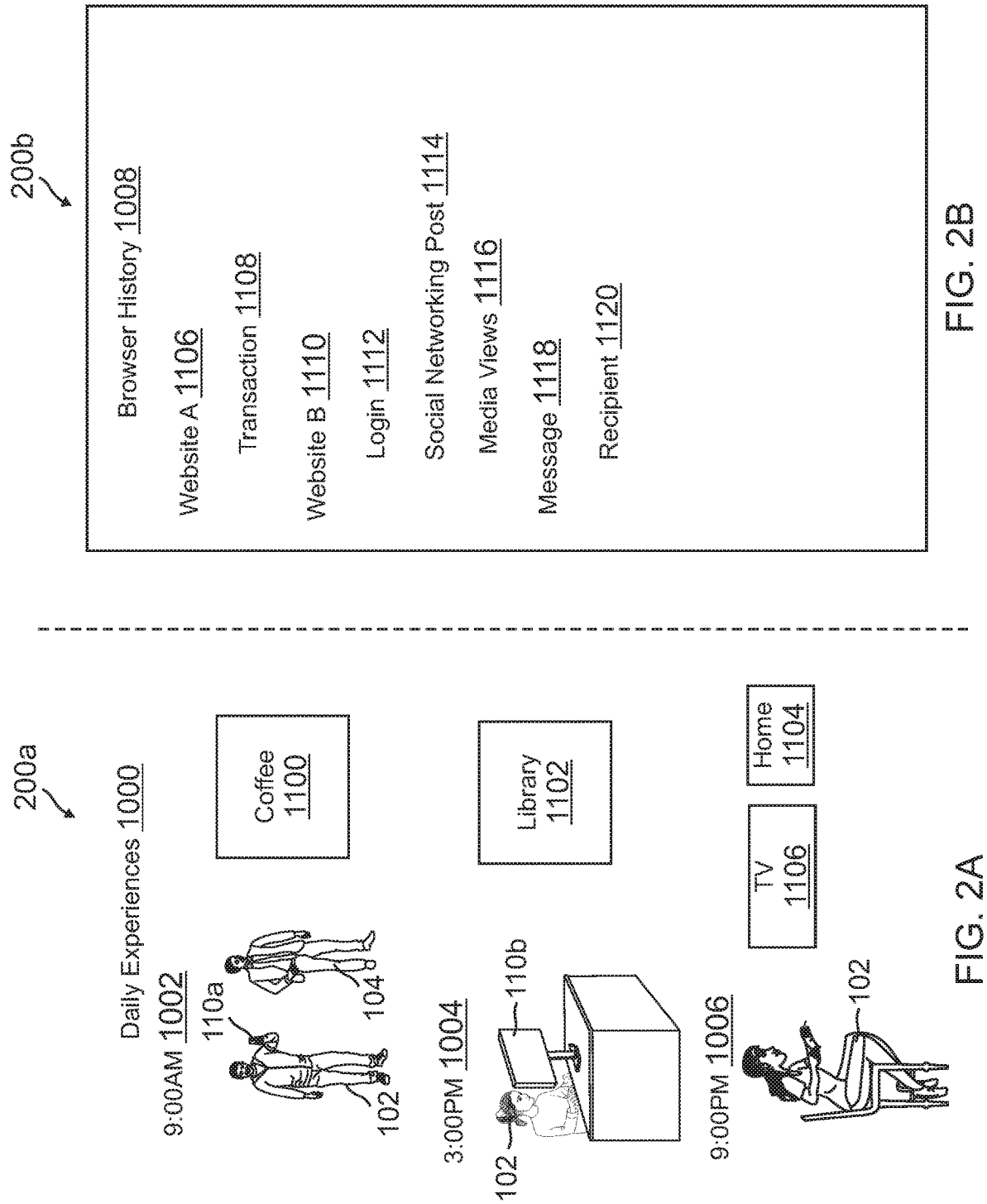

Login Interface 1200

Service Provider A 1202

Login Request 1204
 User Name A 1206
 Password 1208

Authentication Query 1210
 Question 1214

For: User Name A 1206
 1212

Which location were you at @ 3:00PM?
 1216

Answer:
 1218

FIG. 2C

TARGETED AUTHENTICATION QUERIES BASED ON DETECTED USER ACTIONS

CROSS-REFERENCE TO RELATED APPLICATION

This application is a continuation of U.S. patent application Ser. No. 16/405,164, filed on May 7, 2019, issued on Jul. 27, 2021 as U.S. Pat. No. 11,075,924 and is a continuation of U.S. patent application Ser. No. 15/145,728, filed May 3, 2016, issued as U.S. Pat. No. 10,284,567 on May 7, 2019, which are incorporated herein by reference in their entirety.

TECHNICAL FIELD

The present application generally relates to secure electronic authentications of users, and more specifically to targeted authentication queries based on detected user actions.

BACKGROUND

Users may utilize online and/or electronic accounts and services that require a user to authenticate the user's identity and/or account credentials. Such accounts may allow a user to interact in online and/or real-world situations, for example, to message or socialize with other users, engage in and complete financial transactions, share media content, or otherwise perform actions with other users. Moreover, such accounts may include sensitive information, such as personal and/or financial information. Additionally, users may value the identity and use of particular accounts, especially where the user has invested time in creating and utilizing the account, or may be recognized by the account or account name. Thus, proper authentication of the user may be vital when logging in to the account to insure that the account is not improperly used by an incorrect or malicious party. However, authentication may be compromised when another party learns of the user's authentication credentials, such as their username and password, or retrieves an electronic token or physical token representative of the user (e.g., a bank card having encoded information in the card, magnetic strip, or EMV chip). In such cases, the party may utilize the account against the user's wishes. Thus, additional forms of authentication, such as "two-factor authentication," may be utilized by certain entities wishing to provide increased authentication security. However, two-factor authentication may similarly be vulnerable to modern security attacks, including key-loggers, phishing, malware, and other malicious technologies.

BRIEF DESCRIPTION OF THE DRAWINGS

FIG. 2A is an exemplary environment displaying real-world or real-life actions taken by a user and used in a user history, according to an embodiment;

FIG. 2B is an exemplary environment displaying online interactions from an application history for a user and used in a user history, according to an embodiment;

FIG. 2C is an exemplary environment displaying a login interface having an authentication query based on a user history for a user, according to an embodiment;

Figure 1:
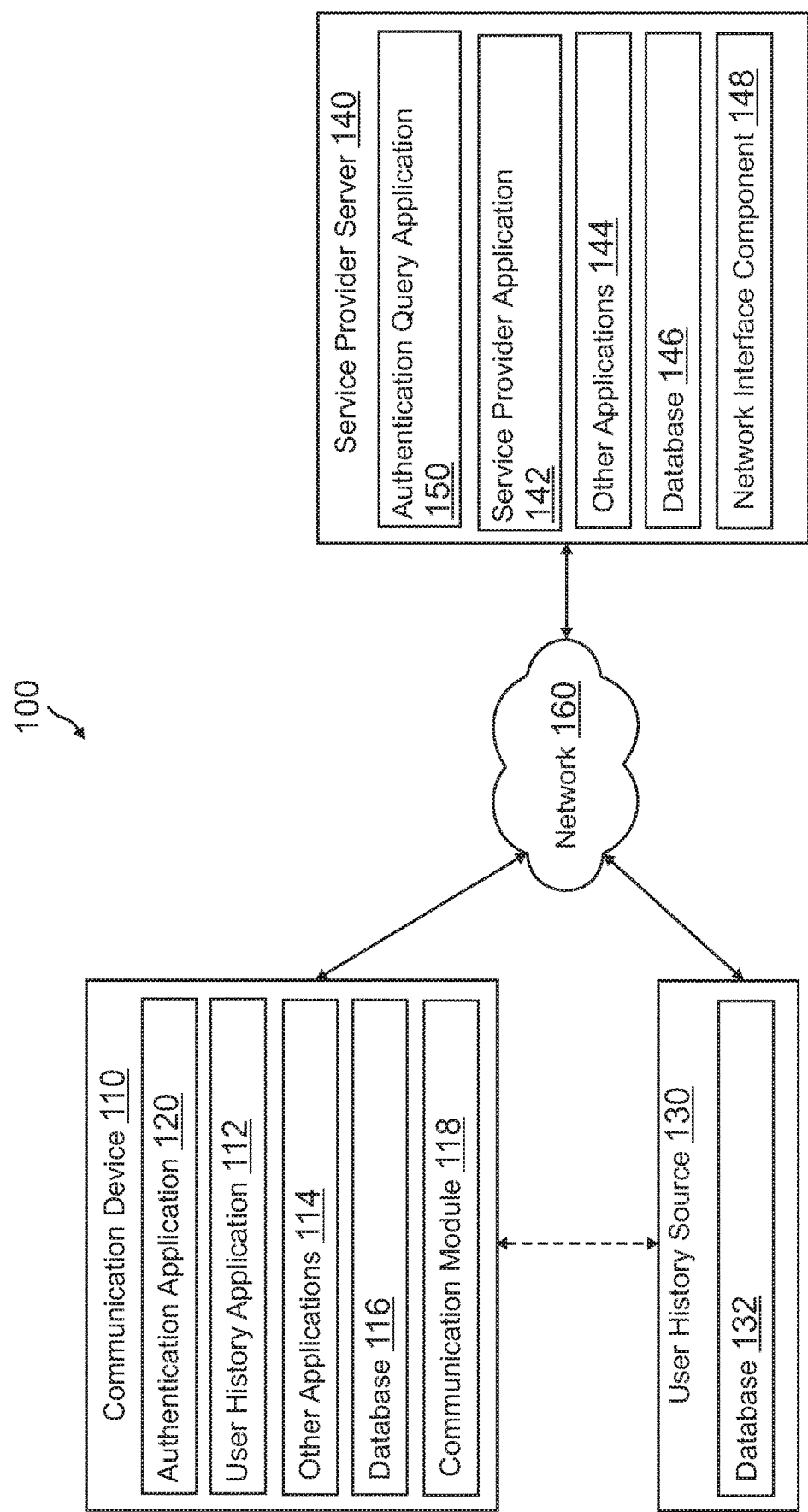
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for targeted authentication queries based on detected user actions. Systems suitable for practicing methods of the present disclosure are also provided.

An online service provider may provide authentication services to users of the online service provider, as well as other entities requesting additional authentication services, such as account providers (e.g., payment service providers, financial institutions, online social networks, media sharing services, and other types of services where a user may be required to authenticate and/or may utilize an account with the service provider). In other embodiments, the service provider may provide account services to the user, where the user may establish and maintain an account to utilize services of the service provider. For example, an online payment provider or other transaction processing entity may provide payment processing, monetary transfer, and other financial services to merchants, consumers, and other users, which may be utilized through one or more applications executing on a user's device (e.g., browser/dedicated application) and an account of the user with the payment provider. In other embodiments, the user may not have an account with the payment provider, but may be required to be authenticated for their identity and/or another account with another service provider. The service provider may further include additional transaction management services, as well as account services for use with the service provider and accessible through a device application, such as a browser application, dedicated application of the service provider, and/or other application (e.g., merchant application) utilizing the processes and features provided by the service provider. Accounts with the service provider may correspond to user accounts, where a holder of the account may utilize services of the service provider through the account. The accounts of users may include personal, device, and financial information, as well as other information that may be determined by or requested from the service provider. Additionally, the user may specify authentication credentials, such as a login name, password, and/or personal identification number (PIN) for use of the account. The authentication credentials may allow the user to verify their identity and/or access the account. Additionally, authentication credentials may also be established with the service provider to establish an identity of the user, for example, through a universally unique identifier, token, password, PIN, or other identifier.

In order to provide increased security for an authentication attempt (e.g., to authenticate the user for use of an account, such as a login attempt, or to validate the identity of the user), the service provider may generate an authentication query for the user based on historical events that the user experienced, observed, or otherwise knows. For example, the service provider may receive, access, or determine a user history for the user, which may include real-life and/or real-world events experienced by or otherwise associated with the user. In this regard, during a time frame tracked in the user's history (e.g., previous hour, day, week, month, etc.) the user may perform various real-life or real-world actions, for example, movement between locations, observation and/or interaction with events, co-Joc_ating with other users, or other types of physical actions by the user. One or more devices or servers may track data associated with the actions of the user, for example, location data (e.g., through a GPS locator), transaction data (e.g., from a financial institution, payment provider, or merchant), biometrics (e.g., through a fingerprint scanner, retinal scanner, pedometer, heart rate detector, perspiration detector, etc.), vehicle use data (e.g., through a vehicle device, such as a console computing device mounted in a vehicle), media viewed and/or consumed data (e.g., through transaction histories and/or device playback), co-located user's data (e.g., through one or more GPS locators and/or devices), or other user data. Additional information for each event may be tracked, including location, time, weather, or other data and metadata associated with the event. Such user data may be utilized to determine the user history for the user, as well as the events experienced in the user history for the user. Where the data includes media viewed or consumed, the data may further include the content for the media consumed.

The user history may also or instead include event data based on online and/or virtual events, actions, and/or history for the user. In this regard, online and/or virtual events experienced, observed, or otherwise known to the user may correspond to actions that the user performs in an online or virtual environment, which may include device actions, server interactions, and other types of virtual world actions performed by a user. For example, the user history may include a browsing history for the user using a browser application executing on a device that the user utilizes (e.g., a communication device including a computer, a smart phone, a tablet, or other computing device) to access and interact with one or more online resources. The browser history may include visited websites, as well as interactions and actions performed on the website. For example, the user may access a messaging platform, such as an email service, instant messaging service, social networking service, etc., to send and/or receive one or more messages, posts, or other content. The messaging platform may be device specific, such as text messaging (e.g., SMS/MMS) used by mobile phones. In other embodiments, the browser history may include other online actions, including electronic payments, purchases, transfers, and other transactions, website logins, media viewed and/or shared, games played, documents viewed and/or generated, work performed, or other types of online actions performed by the user. Moreover, the user may perform similar virtual actions in a virtual environment that may not include an online element or environment. For example, a device may track a user's actions utilizing the device in a virtual environment, such as games played, media consumed, documents generated/viewed, work performed, etc. In addition to utilizing a browser or device history, the online/virtual actions of the user may also be tracked, retrieved, and/or scraped from the online, virtual, and/or device resources used by the user and/or the service provider. In other embodiments, applications executing on the device of the user may also track the online/virtual data and communicate to the service provider the data for use in the user history. The tracked data may include not just the action or event tracked, but also the content tracked. For example, the content may include the type of action/event or name for the action/event, as well as the content within the action/event. In this regard, where the action/event is a watched television show after a visit to a website (e.g., NETFLIX®), the content of the television show may also be tracked, such as the name, episode number, actors, show type (e.g., drama, comedy, etc.), and other information directed to the content. The content information may be stored with the other information and data for the user's online and virtual actions and/or events.

The user history may also include data on other users. For example, the user (e.g., the "first" user) may observe, engage in, or otherwise experience events with another user (e.g., a "second" user). Where the first and second users are friends, the first user may go to dinner with the second user and generate a transaction history or have detected similar locations, which may be stored to the user history. Similarly, where the first user is a family member of the second user, the first user may attend an event for the second user. Thus, user interactions between the first user and the second user may include purchases/payments, detected co-locations, shared and/or viewed media content, messaging and other communications, and other types of user interactions. The first user may associate the second user with the first user using preferences set for the user history with the service provider. However, in other embodiments, the service provider may determine that the first user and the second user are associated by building a trusted circle of users for the first user based on the first user's actions and interactions in the user history. In further embodiments, the user history may be utilized to access another user history for the second user, and utilize both user histories to determine events experienced by or otherwise associated with the first user.

In various embodiments, the service provider may also prime the user with specific content and store the priming information to the user history. In order to prime the user, the service provider may deliver a communication to the user having a priming message, such as alphanumeric text, symbols, an image, a video, an audio recording or clip, or other audio, visual, or audiovisual content. The content of the priming message may be utilized by the service provider to cause the user to make certain associations based on the content. In this regard, the content may cause the user to choose one alternative over another as the user is "primed." Thus, the user is currently or previously thinking of the content, subject matter, or other information from the priming message so as to make associations based on the content of the priming message. Thus, the priming message may serve to alter the user's associative memory to make these associations. For example, where the user is sent the word "superhero," if the user is later given the puzzle "finish this word: CA_E," the user is more likely to enter CAfE over CAVE. CAKE, or other similar words. Such priming messages may be communicated to the user and stored with the user history.

Once the user history is established, the user history may be utilized to determine the additional authentication query or queries to present to the user during an authentication process. For example, the user may request to be authenticated by the service provider or entity associated with the service provider. The user may provide a name, username, token, or other identifier that allows the service provider and/or entity to identify the user. In various embodiments, this may include providing authentication credentials, such as a username and password in a login screen. The credentials or other identifiers may be used to access the user history and determine an authentication query to the user based on the user history. The authentication query may include a question or request based on one or more of the events experienced by or otherwise associated with the user in the user history. In this regard, the question or request may ask the user to provide an answer that is based on the user's experiences, actions, and/or events in the user history for the user. Thus, only the user (or an associated user who has experienced the same event, such as the second user known to the first user) may know the answer to the question. Additionally, the question or request may utilize experiences of the user related to the event and other data or metadata for the event in the user history. In this way, the question or request may be tailored to have answers associated with the experiences of the user over content of the events. Thus, another user may not be able to perform a lookup of the event to determine the event's content, such as a storyline to media consumed by the user. Instead, the question may be related to the name of the media, time consumed, location, etc.

In order to determine the question and the associated answer (or acceptable answers, where the answer may have more than one possible correct answer or be open ended), the service provider may utilize at least one prior event experienced by or otherwise associated with the user. Thus, the question may ask the user a name of an event (e.g., name of media consumed, event type, etc.), a location, a time of the event, or other question about the event. The answer may therefore come from the user's experience with the event. Thus, the question may require the user to respond with the user's experience of the event. The question may also utilize multiple prior events experienced by or otherwise associated with the user, for example, where the question provides for multiple answers or requires a multiple part answer, which may increase security of the authentication query. The question may also provide for answers that may be selected in response to the event or events experienced by or otherwise associated with the user, similar to a priming message, by having a set or subset of available answers with one answer as correct that may be selected by the user based on the user's experiences. In various embodiments, the question may instead or additionally utilize the priming message communicated to the user in the user history. For example, the question may provide for a specific answer from a set or subset of available answers that would be chosen in response to the priming message. The question may be a factor of both the event and the priming message such that the question may include a set or subset of answers likely to be selected based on one of the events and the priming message, where the event of the priming message may further cause the user to select a correct answer from the group.

The question in the authentication query may take multiple different types of forms. For example, the question may correspond to a multiple choice question having selectable fields (e.g., drop down menu, field selections, etc.), an open ended question (e.g., having a text box for entry of an answer), or may aUow for other types of data entry for the answer to the question, including image data, audio data, video data, or other captured data, including data captured by other devices (e.g., biometrics). The authentication query may additionally take one or more of multiple different types of query forms, such as a text-based query, an image based query, a sound clip query, a video query, a number-based query, an audio query, a visual query, and/or an audio-visual query. Such query types may correspond to how the question is presented and/or how the answer to the question is inputted. For example, the query may include an image based question providing one or more images to the user and requiring the user to select one or more of the images. The query may also display one or more video or audio clips, and require the selection of a correct clip or identification of the correct clip. Other forms of data matching and querying may be performed by the authentication query.

The service provider may receive the response or answer to the question in the authentication query. Where the response is correct or otherwise satisfies the question, the service provider may authenticate the user, for example, by establishing their identity and/or providing account access. In various embodiments, the service provider may assist another entity, such as another service provider, merchant, or other entity, with authentication. In such cases, the service provider may not fully authenticate the user, but may respond to the entity that the user satisfactorily answered the question. The entity may then authenticate the user.

However, where the user incorrectly answers or responds to the question, the service provider may not authenticate the user. The service provider may generate another query for the user where the user fails to correctly answer the authentication query. The next query may be generally generated based on the user's user history as before. However, in other embodiments, the next query may instead be based on the user's incorrect response to the previous query, as well as incorrect responses to other previous queries. For example, if the user consistently fails to correctly respond to audio queries based on a song heard earlier that day by the user, the service provider may choose not to utilize audio based queries, or may utilize such queries more infrequently. Similarly, if the user answers image based queries easily and quickly, the service provider may favor image based queries. In this way, the service provider may learn from the user's responses that are correct and incorrect to determine a best query type for the user when generating an authentication query. The service provider may further utilize the data of the queries that the user answers incorrectly and correctly to determine a difficultly level for a current query based on the query type. Thus, if the user consistently answers image based queries correctly, the difficulty of such queries may be increased to increase security in the system. Additionally, biometrics for the user may be utilized to determine the query type and/or difficulty. For example, if the user's pupil dilation indicates increased attentiveness to an event and/or authentication query, the user may be more likely to respond correctly to such queries. Moreover, the user may be locked out from further authentication attempts after the first try, or the user may be locked out after successive tries.

In various embodiments, the user may instead request a new query, for example, if the authentication query is of a query type that the user does not like or where an answer to the question in the authentication query is unknown or cannot be recalled by the user. Similar to above where the user answers incorrectly, a new query may be generated, which may depend on the user's success rate and/or preference for certain types of queries. For example, if the user consistently chooses to pass on answering audio based queries, the service provider may choose to utilize another query type. Moreover, where the user consistently chooses to answer image based queries, the service provider may favor providing the user with image based queries. The service provider may further select a difficulty based on the user's preferences for certain query types.

Thus, authentication queries may be made more robust through the use of user actions and events that the user is associated with from a user history. In this regard, problems with single or dual factor authentication may be remedied through determining a further authentication query using user data tracked for the user. For example, although authentication requests may utilize information that should be known only to a user, such as a password or PIN number, such information may be vulnerable to theft and discovery by other parties, such as malicious parties using malware, viruses, key-loggers, or other types of authentication compromising processes. Thus, the disclosed processes provided herein utilize user histories of user data to provide a solution to such problems. By generating a query targeted to data known by the user based on the user's actions, events, and/or other experiences, malicious parties may become increasingly unlikely to correctly answer such questions. Consequently, authentication queries become less vulnerable to traditional security concerns.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device L10, a user history source 130, and a service provider server 140, in communication over a network 160. A user (not shown) may utilize communication device 110 to request authentication for an identity and/or account using authentication credentials, which may be performed with service provider server 140 or another entity. Service provider server 140 may access a user history for the user, which may include actions tracked by one or more of communication device 110 and user history source 130. Service provider server 140 may utilize the user history to determine an authentication query based on at least one event experienced by or otherwise associated with the user in the user history. The authentication query may be presented at the time of authentication, and a response from the user may be requested in order to authenticate the user. In embodiments, where the authentication is requested from service provider server 140, service provider server 140 may further authenticate the user using the authentication credentials and the response to the authentication query.

Communication device 110, user history source 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with user history source 130 and/or service provider server 140. For example, in one embodiment, communication device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains an authentication application 120, a user history application 112, other applications 114, a database 116, and a communication module 118. Authentication application 120, user history application 112, and other applications 114 may correspond to executable processes, procedures, and/or applications with associated hardware. In other embodiments, communication device 110 may include additional or different modules having specialized hardware and/or software as required.

Authentication application 120 may correspond to one or more processes to execute modules and associated devices of co•mmunication device 110 to request authentication from an entity, including service provider server 140, display an authentication interface including an authentication query generated by service provider server 140, and provide authentication credentials and a response to the authentication query. In this regard, authentication application 120 may correspond to specialized hardware and/or software utilized by communication device 110 to first access and/or communicate with an entity that the user of communication device 110 would like to authenticate the user's identity and/or for access or use of an account. For example, authentication application 120 may correspond to an application utilized to access a website of an entity, including service provider server 140, and retrieve and load an authentication interface (e.g., a login screen, interface, or webpage for the website). Thus, in various embodiments, authentication application 120 may correspond to a general browser application configured to retrieve, present, and communicate information over the Internet (e.g., utilize resources on the World Wide Web) or a private network. For example, authentication application 120 may provide a web browser, which may send and receive information over network 160, including retrieving website information, presenting the website information to the user, and/or communicating information to the website, including authentication interfaces and related data, as well as data and interfaces before and after authentication (e.g., navigation to a login screen, an account screen after login, etc.). However, in other embodiments, authentication application 120 may include a dedicated application of service provider server 140 or other entity (e.g., a merchant, payment provider, etc.), which may be configured to provide service through the application, including authentication of a user identity and/or account access. Authentication application 120 may be utilized to establish and/or maintain a user account, payment account, digital wallet, and/or other online or virtual account with service provider server 140.

Thus, authentication application 120 may be associated with a service that requires authentication through at least one of a token, identifier, and/or credentials, and a successful response to an authentication query. In this regard, authentication application 120 may present an interface to a user of communication device 110, where the interface allows the user to present identifying material for the user, such as the token, identifier, and/or account/authentication credentials. Such identifier may correspond to a personal, device, or other identifier or token, including a generated token by the service or entity (e.g., service provider server 140) or a token provided by the user (e.g., name, username, account identifier, image, digital certificate, etc.). Once provided, service provider server 140 may determine an authentication query based on a user history for the user. The authentication query may be presented through the interface of authentication application 120. The user may then respond to the query using authentication application 120. Once authenticated, authentication application 120 may be utilized to perform, engage in, and/or utilize the various services requiring authentication, such as payment services, social networking, messaging, media sharing, account, and other provided services.

User history application 112 may correspond to one or more processes to execute modules and associated devices of communication device 110 to generate, receive, and/or transmit user data and other information to service provider server 140 for use in determining or generating a user history for the user of communication device 110. In this regard, user history application 112 may correspond to specialized hardware—and/or software utilized by communication device 110 to detect, determine, and/or generate user information. For example, user history application 112 may collect, capture, and/or otherwise determine user data for the user by monitoring the user and actions of the user. The user data may correspond to locations of the user, which may further be determined using a location determination system, such as a GPS module of communication device 110 and associated systems. In other embodiments, the user's actions may correspond to biometrics, exercise data, and/or nutritional information, which may be inputted by the user and/or captured with the assistance of a connected device, such as a pedometer (e.g., a FITBIT® or .similar device using a short range wireless communication with communication device 110, such as user history source 130). The user data may be provided to service provider server 140 for use in determining a user history. In various embodiments, user history application 112 may determine the user data provided to service provider server 140 using other applications and/or processes of communication device 110, including messaging applications (e.g., email, SMS/MMS, instant messaging, and/or social networking messaging), Internet browsers (e.g., browser histories and online interactions), Internet search engines, social networking applications, merchant and shopping applications, travel applications (e.g., travel fare reservation and purchasing applications including air travel, as well as local travel applications for utilizing subways, taxis, car rentals, and other transportation local to the user), and/or mapping applications. Additional user data captured by user history application 112 may include media viewing applications, video games, word processors and associated applications, and/or other types of modules, processes, and applications which may track and/or determine the user's actions. User history application 112 may then provide the user actions and other user data (e.g., personal, financial, and other user information) to service provider server 140 for processing, as discussed herein.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APis) over network 160, or other types of applications. Other applications 114 may also include additional communication applications, such as email, texting, voice, and IM applications that allow a user to send and receive emails, calls, texts, and other notifications through network 160. In various embodiments, other applications 114 may include financial applications, such as banking, online payments, money transfer, or other applications 114. Other applications 114 may also include other location detection applications, such as a mapping, compass, and/or GPS application, which may be used to determine a location for the user that is communicated to payment provider server 130. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user. Other applications 114 may be monitored by user history application 112 in order to determine user data and provide the user data to service provider server 140.

Communication device 110 may further include database 116 stored to a transitory and/or non-transitory memory of communication device 110, which may store various applications and data and be utilized during execution of various modules of communication device 110. Thus, database 116 may include, for example, identifiers (IDs) such as operating system registry entries, cookies associated with user history application 112 and/or other applications 114, IDs associated with hardware of communication device 110, or other appropriate IDs, such as IDs used for payment/user/device authentication or identification. Database 116 may include authentication credentials and/or loaded authentication interfaces, as well a user data for use in determining a user history.

Communication device 110 includes at least one communication module 118 adapted to communicate with user history source 130 and/or service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

User history source 130 may be implemented as a storage source that may store user data and other information for use in determining a user history for the user associated with communication device 110. In various embodiments, user history source 130 may include one or more hardware and/or software components to access, determine, and/or provide the user data. For example, user history source 130 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. In other embodiments, user history source 130 may correspond to a server and/or online database, as well as cloud computing architectures, or a local storage device, such as a USB flash drive or computer hard drive. Although only one source is shown, a plurality of sources may function similarly.

User history source 130 of FIG. 1 contains a database 132. In various embodiments, user history source 130 may further include executable processes, procedures, and/or applications with associated hardware. Additionally, user history source 130 may include additional or different modules having specialized hardware and/or software as required.

User history source 130 includes a database 132 stored to a transitory and/or non-transitory memory of user history source 130, which may store various data of user history source 130. Database 132 may include information for the user of communication device 110, such as user data for real-life/world and online/virtual actions of the user, events experienced by or otherwise associated with the user, and other occurrences related to the user. In this regard, database 132 may include data corresponding to physical events associated with the user of communication device 110, such as locations, transactions, associated users, real-world events attended, and other data for real-life situations that the user experiences or knows. Additionally or in other embodiments, database 132 may further include data for virtual or online events experienced by the user, including messaging, digital transactions, website/device/server interactions, gaming experiences, media shared/viewed, connections made and/or utilized, and other types of virtual/online events. Communication device 110 and/or service provider server 140 may retrieve user data from user history source 130 for use in determining a user history.

Service provider server 140 may be maintained, for example, by an online service provider, which may provide authentication services for the user associated with communication device 110, as well as other entities where the other entities are requesting increased authentication security using one or more processes of service provider server 140. In this regard, service provider server 140 includes one or more processing applications which may be configured to interact with communication device 110, user history source 130, and/or another device/server to facilitate authenticating a user through an authentication query generated by service provider server 140 using a user history for the user. In one example, service provider server 140 may be provided by PAYPAL®, Inc. of San Jose, Calif., USA. However, in other embodiments, service provider server 140 may be maintained by or include a financial service provider, social networking service, email or messaging service, media sharing service, and/or other service provider, which may provide authentication services, for example, for the use of a provider account.

Service provider server 140 of FIG. 1 includes an authentication query application 150, a service provider application 142, other applications 144, a database 146, and a network interface component 148. Authenticatio•ri query application 150, service provider application 142, and other applications 144 may correspond to executable processes, procedures, and/or applications with associated hardware. In other embodiments, service provider server 140 may include additional or different modules having specialized hardware and/or software as required.

Authentication application 150 may correspond to one or more processes to execute modules and associated specialized hardware of service provider server 140 to access a user history for a user based on a received identifier or credential, and generate an authentication query based on the user history. In this regard, authentication query application 150 may correspond to specialized hardware and/or software to receive a credential, token, or other identifier allowing authentication query application 150 to identify the user associated with communication device 110 and/or retrieve a user history for the user. The user history may include information and other user data received from communication device 110 and/or user history source 130, such as real-life and virtual events and/or actions of the user. In certain embodiments, user data in the user history may also be generated by authentication query application 150, such as one or more priming messages stored to the user history and transmitted to communication device 110. In various embodiments, the credentials may correspond to authentication credentials, where service provider server 140 may perform the authentication. However, in other embodiments, another entity may be utilizing processes of service provider server 140, and the token or identifier may be limited to identifying the user and/or user history.

Using the user history, an authentication query may be generated having a question based on an event experienced by the user in the user history. The authentication query question may require the user to respond with information associated with the event, such as a name, time, location, or other information known to the user. Thus, the answer may correspond to the user's experience. In various embodiments, multiple prior events may be utilized, which may allow for multiple correct answers and/or a multiple part answer. The question may also not directly inquire about the event, but may instead use the event to prime the user's answer by allowing for an answer likely to come-from the user's experience with the event. In various embodiments, the question may instead or additionally utilize the priming message communicated to the user in the user history.

Authentication query application 150 may utilize multiple different query types for the question, such as multiple choice, selection, an open ended question (e.g., having a text box for entry of an answer), or other type of query. The authentication query may additionally take one or more of multiple different types of query form, such as a text-based query, an image based query, a sound clip query, a video query, a number-based query, an audio query, a visual query, and/or an audio-visual query. Once the user answers the question, authentication query application 150 may determine whether the response satisfied the query. If so, authentication query application 150 may authenticate the user or notify another entity of the user's correct response. Where the response is incorrect, authentication query application 150 may prepare a new authentication query, or may deny authentication to the user. Additionally, the user may request that authentication query application 150 generate a new query, for example, where the query is undesirable or an answer is unknown or forgotten by a user.

Authentication query application 150 may further learn from the user's responses a better or more preferred query type for the user when generating an authentication query. For example, authentication query application 150 may utilize historical data of correct responses, incorrect responses, and new query requests to determine a query type favored by the user associated with communication device 110. Authentication query application 150 may then utilize this information to determine and generate authentication queries consistent with the best or most favored authentication queries for the user. Additionally, the historical data may be utilized to determine a difficulty level of the authentication query, for example, based on how likely it is that the user answers the query. Authentication query application 150 may then increase security of the authentication request by utilizing the highest degree of difficulty query and/or query type that the user is often, always, or usually capable of answering.

Service provider application 142 may correspond to one or more processes to execute modules and associated specialized hardware of service provider server 130 to receive and/or transmit information from communication device 110 for establishing an account or utilizing another service of service provider server 140. In this regard, service provider application 142 may correspond to specialized hardware and/or software to establish an account, for example, a payment account, which may be utilized to send and receive payments and monetary transfers and engage in other financial transactions. Other types of accounts may correspond to messaging, social networking, media sharing, microblogging, and other types of accounts associated with a provided service. A user associated with communication device 110 may establish an account with service provider application 142 by providing personal and/or financial information to service provider server 140 and selecting an account login, password, and other authentication information. The account may be accessed and/or used through a browser application and/or dedicated payment application executed by communication device 110. In order to authenticate an identity of a user and/or for use of the account, authentication query application 150 may be utilized with service provider application 142 to authenticate the user associated with communication device 110. Once authenticated, service provider application 142 may be utilized to use various services provided by service provider server 140, such as payment, social networking, messaging, or other available service.

In various embodiments, service provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to the user when accessing payment provider server 134. In various embodiments, where not provided by service provider application 142, other applications 144 may include connection and/or communication applications, as well as user account applications, which may be utilized by the user associated with communication device 110.

Additionally, service provider server 140 includes database 146. Accounts in database 146 may include entity information, such as name, address, birthdate, payment/ funding informati_on, additional user financial information, and/or other desired user data. The entity may link to their respective accounts through an account, user, merchant, and/or device ID, as well as a generated token, which may be provided to communication device 110 for use. Thus, when an ID is transmitted to service provider server 140, e.g., from communication device 110, an account belonging to the entity may be found. User histories for users may be stored to database 146, as well as generated authentication queries from the user histories and for use in authenticating a user.

In various embodiments, service provider server 140 includes at least one network interface component 148 adapted to communicate with communication device 110 and/or user history source 130 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

FIG. 2A is an exemplary environment displaying real-world or real-life actions taken by a user and used in a user history, according to an embodiment. In environment 200a of FIG. 2A, a user may perform actions and/or engage in events during different times throughout a day.—Thus, environment 200a shows daily experiences 1000, which may correspond to actions and events throughout a day for a user 102. Data for the events and actions may be stored to a user history for user 102.

For example, at a 9:00 AM time 1002, user 102 may be involved in a first event during the day. User 102 is shown as interacting with user 104. User 102 is further shown at or nearby a coffee location 1100. Data for user 102 and the event at 9:00 AM time 1002 may be tracked through location data for a communication device 110a in possession of user 102. Additionally, communication device 110a may track additional data and store the data to a user history. Such data may be used to determine the action and/or event for user 102 at 9:00 AM.

In similar fashion, data for user 102 may be tracked at a 3:00 PM time 1004 and a 9:00 PM time 1006. For example, at 3:00 PM time 1004, user 102 may be located at library 1102 and utilizing a communication device 110b, such as a student that may be doing research or writing for a class. Data for the location of user 102 and use of communication device 110b may be stored to the user's history. At 9:00 PM time 1006, user 102 may utilize communication device 110c to watch media at a home location 1104. Thus, the location 1104 and media viewed may be stored to a user history for the time of 9:00 PM 1006. Using such data, the user history may include information on the events and actions experienced by user 102.

FIG. 2B is an exemplary environment displaying online interactions from an application history for a user 102 and used in a user history, according to an embodiment. Environment 200b of FIG. 2B includes data from online and virtual actions of a user, including events experienced by the user, which may be utilized in a user history for the user. Thus, the data in environment 200b may be received by a service provider and stored to a user history for the user.

In this regard, browser history 1008 in environment 200b includes data from online actions by a user, such as navigation to one or more websites and interactions on the website. For example, browser history 1008 stores browsing history for the user with a website A 1106. At website A 1006, the user may engage in one or more actions, such as a transaction 1108. Data for transaction 1108 may include a merchant name, purchased item, price, time, and other transaction information. Similarly, at a website B 1110, the user may perform a login 1112, as well as provide a social networking post 1114 and/or perform media view 1116 of media content (e.g., images and/or videos at website B 1110). Browser history 1008 may also include information for a message 1118, such as a recipient of message 1120. The aforementioned data may then be stored to a user history for use in determining authentication queries.

FIG. 2C is an exemplary environment displaying a login interface having an authentication query based on a user history for a user, according to an embodiment. Login interface 1200 in environment 200c may correspond to an interface of an application executed by a communication device 110, such as authentication application 120 of communication device 110 in FIG. 1. In this regard, login interface 1200 may include an interface, such as a graphical user interface of a device application, which may be used to enter authentication credentials and respond to an authentication query.

Login interface 1200 includes information identifying service provider A 1202 as the authentication provider for the authentication process in login interface 1200. For example, service provider A 1202 may process login request 1204 for a user name A 1206 and a password 1208. However, in order to process login request 1204, service provider A 1202 may require the user to respond to an authentication query 1210 generated using the actions and events detected in FIGS. 2A and 2B. For example, an authentication query 1210 may be generated and targeted to user name A 1206 in field 1212. The authentication query 1210 may be generated after looking up the user history for user name A 1206. Authentication query 1210 may include a question 1214, which may be displayed in field 1216. For example, field 1216 includes text "Which location were you at@ 3:00 PM?". The user may type in answer field 1218, or may select from a drop down box. Thus, as shown in FIG. 2A, the user may respond with "Library" to satisfy authentication query 1210.

Figure 3:
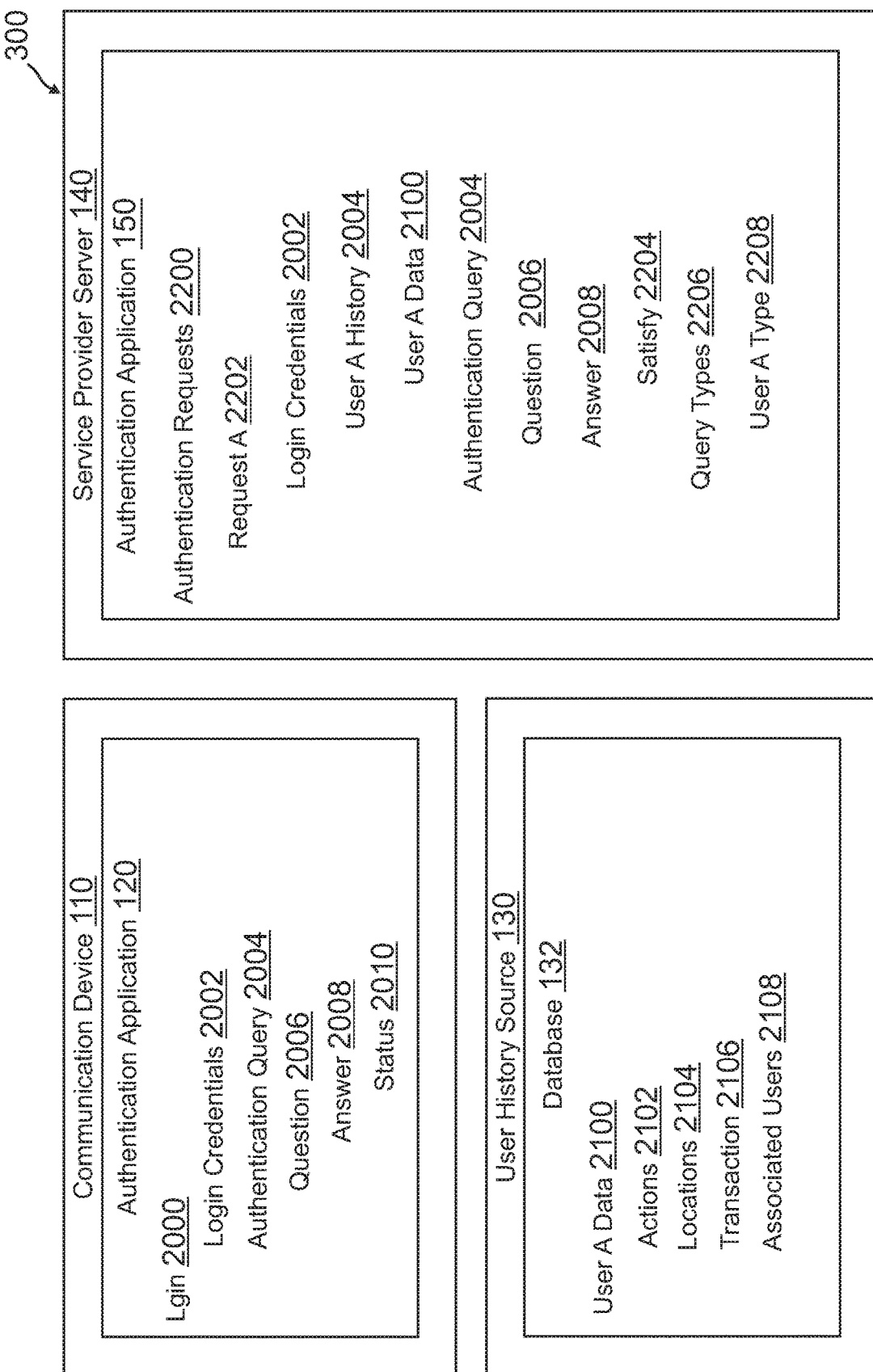
FIG. 3 is an exemplary system environment having a communication device and a service provider for targeted authentication queries based on detected user actions, according to an embodiment.

FIG. 3 is an exemplary system environment 300 having a communication device 110 and a service provider for targeted authentication queries based on detected user actions, according to an embodiment. Environment 300 of FIG. 3 includes a communication device 110, a user history source 130, and a service provider server 140 corresponding generally to the described devices and associated features found in system 100 of FIG. 1.

Communication device 110 executes an authentication application 120 corresponding generally to the specialized hardware and/or software modules and processes described in reference to FIG. 1. In this regard, user history application 112 includes information for sent and received messages. For example, authentication application 120 may provide information to service provider server 140 for use in generating an authentication query, and display a received authentication query to the user of communication device 110. Thus, authentication application 120 includes a login 2000, which may include login credentials 2002. In response to providing login credentials 2002, an authentication query 2004 may be generated. Authentication query 2004 includes a question 2006 based on a user history, and may be responded to with an answer 2008. Based on answer 2008 and login credentials 2002, status 2010 for the authentication query may be provided, such as a successful or failed authentication attempt using answer 2008 and login credentials 2002.

User history source 130 includes a database 132 corresponding generally to the specialized hardware and/or software modules and processes described in reference to FIG. 1. In this regard, database 132 may provide data to service provider server 140 for use in determining a user history, where the user history may be utilized to determine authentication query 2004 by service provider server 140. Thus, database 132 includes user A data 2100 for a user A associated with communication device 110. User A data 2100 includes actions 2102 of the user, such as real-world actions, online actions, virtual actions, and other types of user actions (e.g., exercise, work, etc.). User A data 2100 may further include locations 2104 for user A, a transaction 2106, and associated users 2108.

Service provider server 140 executes an authentication application 150 corresponding generally to the specialized hardware and/or software modules and processes described in reference to FIG. 1. In this regard, authentication application 150 includes information that may be used to determine authentication queries, including authentication query 2004 for communication device 110. For example, authentication requests 2200 may be processed by authentication application 150 to determine authentication queries during authentication requests 2200. A request A 2202 may be used to retrieve a user history using login credentials 2002 provided to service provider server 140 by communication device 110 using authentication application 120. User A history 2204 includes user A data 2100 retrieved from user history source 130. Using user A history 2204, authentication query 2004 may be generated having a question 2006 based on an event experienced by user A in user A history 2204, such as user A data 2100. Additionally, authentication query 2004 may be associated with answer 2008, where authentication query 2004 determines a satisfy condition 2206 of whether answer 2008 answers question 2006. Additionally, authentication application 150 may include information for query types 2208, which may include a user A type 2210.

Figure 4:
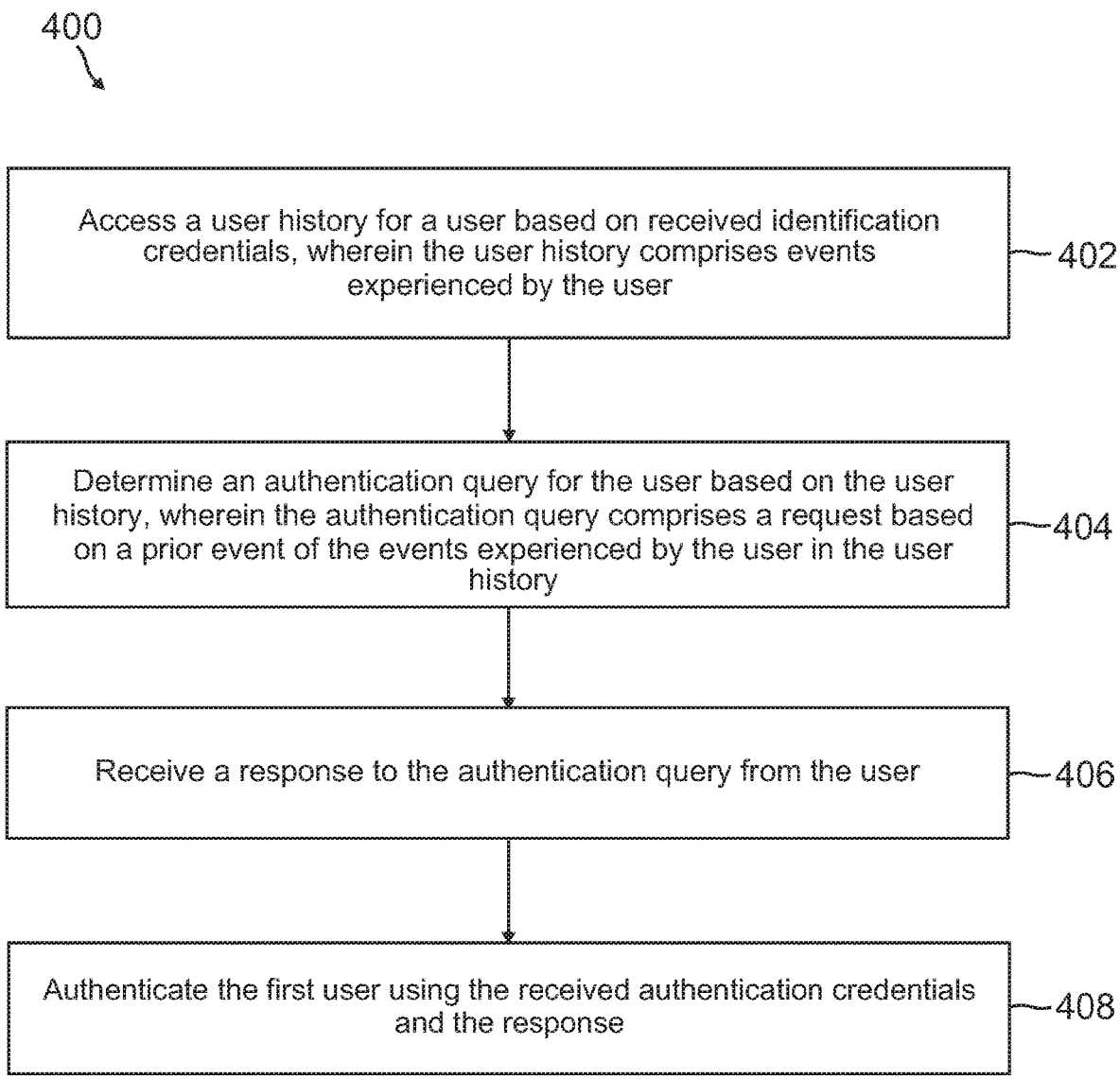
FIG. 4 is an exemplary process flowchart for targeted authentication queries based on detected user actions, according to an embodiment.

FIG. 4 is an exemplary process flowchart 400 for targeted authentication queries based on detected user actions, according to an embodiment. Note that one or more steps, processes, and methods described herein may be omitted, performed in a different sequence, or combined as desired or appropriate.

At step 402, a user history for a user is accessed, by a service provider, based on received authentication credentials, wherein the user history comprises events associated with the user. The authentication credentials may be received from an authentication request by the user, where the authentication request is received from an authentication login screen provided by the system to the user through a website or a dedicated application associated with the service provider.

At step 404, an authentication query for the user is determined based on the user history, wherein the authentication query comprises a question based on a prior event of the events associated with the user in the user history. A second user associated with the first user may be determined using the first user history, where a second user history for the second user is accessed. Thus, the first question for the first authentication query may be further based on the second user history. The second user may be determined to be associated with the first user based on at least one family member in the first user history, transaction histories in the first user history, co-located location between the first user and the second user in the first user history and the second user history, and settings by the first user in the first user history. Moreover, a level of difficulty for the first question in the first authentication query may be determined based on previous questions to the first user, wherein the first question for the first authentication query is further based on the level of difficulty. The first authentication query may not be based on media content associated with the first prior event. Additionally, a priming message for the user may be generated, wherein the priming message comprises one of a text phrase, an image, and a video for the user, and wherein the priming message is used to answer the question by the user. The priming message may be communicated to the user, wherein the question for the authentication query is further based on the priming message. The priming message may be communicated to the user at a start of a time period prior to receiving the authentication request for the user.

The user history may be determined using at least one online resource, wherein the user history comprises at least one online action by the user using the at least one online resource. The question in the authentication query may comprise a multiple choice question with one correct answer to the multiple choice question comprising one of the at least one online actions. The user history may be determined from data received from at least one of a communication device 110 of the user, a device connectable to the communication device, and a sensor connectable to the communication device 110, wherein the user history comprises at least one real-life action by the user determined using the data. Thus, the question in the authentication query may comprise a multiple choice question with one correct answer to the multiple choice question comprising one of the at least one real-life actions by the user.

A response to the authentication query is received from the user, at step 406. And, at step 408, the first user is authenticated using the response. Thus, the received authentication credentials may be received from an authentication login screen for a website or an application separate from the service provider, wherein authenticating the user comprises communicating whether the response satisfies the question to the website or the application separate from the service provider. In order to authenticate the user, it may be determined whether the response satisfies the question, such as if the response does or does not answer the question. Where the response does not answer the question, a second authentication query for the user may be determined using the user history, wherein the second authentication query comprises a second question based on one of a first prior event and a second prior event of the events in the user history. Thus it may be determined whether a second response to the second authentication query satisfies the second question based on one of the first prior event and the second prior event.

The first authentication query and the second authentication query may be different query types, wherein the query types comprise at least two of a text-based query, an image based query, a sound clip query, a video query, a number-based query, an audio query, a visual query, and an audio-visual query. In such embodiments, a best query type from the query types for the first user may be determined, wherein the best query type comprises one of the query types that the first user is most successful at answering. Additionally, at least one of the first authentication query, the second authentication query, and further authentication queries may be determined using the best query type. In further embodiments, the first response may comprise a request for another authentication query by the first user. Thus, a second authentication query may be determined having a second question using a different query type. A second response may be processed to determine whether the second response satisfies the second question. In such embodiments, a favored query type for the first user may be determined based on the request and the different query type, wherein at least one of the first authentication query, the second authentication query, and further authentication queries are determined using the favored query type.

Figure 5:
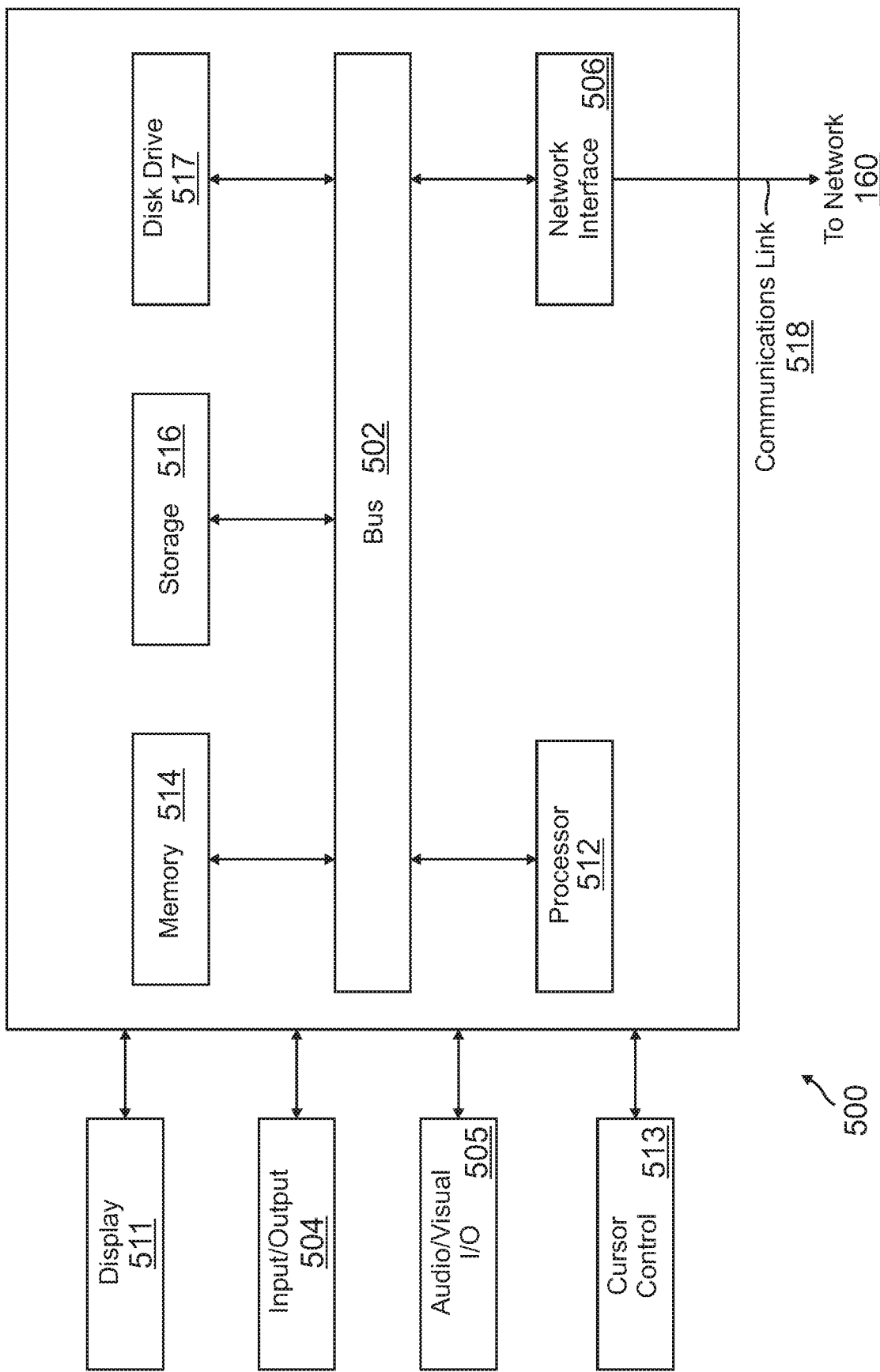
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g, such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A system comprising:
 a non-transitory memory storing instructions; and
 a processor configured to execute the instructions to cause the system to:
  retrieve information associated with a user of a device;
  analyze the information retrieved to determine an authentication query used to identify the user of the device;
  generate a priming message associated with at least a past event of the user from the information retrieved, wherein the priming message comprises event information for the past event that indicates a correct answer to the authentication query used to identify the user of the device;
  determine the authentication query based in part on a user biometric obtained with the information retrieved and the event information, wherein the authentication query is determined to have a plurality of incorrect answers and the correct answer; and
  transmit, over a network connection, the priming message and the authentication query to the user associated with the device, wherein the priming message is configured to prompt the user via the device for the correct answer to the authentication query.

2. The system of claim 1, wherein the information retrieved includes historical information associated with the user of the device.

3. The system of claim 2, wherein the historical information further includes at least one of a user profile information, transaction information, or social media communication.

4. The system of claim 1, wherein the instructions further cause the system to:
 receive a response associated with the authentication query transmitted; and
 authenticate the user associated with the device based on response received.

5. The system of claim 1, wherein the user biometric obtained includes one of a fingerprint, a retinal scan, or a heart rate detection metric.

6. The system of claim 2, wherein the priming message further includes a communication designed to cause the user to make an association with the past event that identifies the correct answer based on content provided in the priming message for the event information.

7. The system of claim 6, wherein the priming message further includes a video or image designed to cause the user to make the association in the authentication query transmitted.

8. The system of claim 6, wherein the priming message is further generated based in part on a user history that includes a user transaction associated with the past event.

9. A method comprising:
 retrieving information associated with a user of a device;
 analyzing the information retrieved to determine an authentication query used to identify the user of the device;
 generating a priming message associated with at least a past event of the user from the information retrieved, wherein the priming message comprises event information for the past event that indicates a correct answer to the authentication query used to identify the user of the device;
 determining the authentication query based in part on a user biometric obtained with the information retrieved and the event information, wherein the authentication query is determined to have a plurality of incorrect answers and the correct answer; and
 transmitting, over a network connection, the priming message and the authentication query to the user associated with the device, wherein the priming message is configured to prompt the user via the device for the correct answer to the authentication query.

10. The method of claim 9, wherein the information retrieved includes historical information associated with the user of the device.

11. The method of claim 10, wherein the historical information further includes at least one of a user profile information, transaction information, or social media communication.

12. The method of claim 9, further comprising:
receiving a response associated with the authentication query transmitted; and
authenticating the user associated with the device based on response received.

13. The method of claim 9, wherein the user biometric obtained includes one of a fingerprint, a retinal scan, or a heart rate detection metric.

14. The method of claim 10, wherein the priming message further includes a communication designed to cause the user to make an association with the past event that identifies the correct answer based on content provided in the priming message for the event information.

15. The method of claim 14, wherein the priming message includes a video or image designed to cause the user to make the association in the authentication query transmitted.

16. The method of claim 14, wherein the priming message is further generated based in part on a user history that includes a user transaction associated with the past event.

17. A non-transitory machine-readable medium having stored thereon machine readable instructions executed to cause a machine to perform operations comprising:
retrieving information associated with a user of a device;
analyzing the information retrieved to determine an authentication query used to identify the user of the device;
generating a priming message associated with at least a past event of the user from the information retrieved, wherein the priming message comprises event information for the past event that indicates a correct answer to the authentication query used to identify the user of the device;
determining the authentication query based in part on a user biometric obtained with the information retrieved and the event information, wherein the authentication query is determined to have a plurality of incorrect answers and the correct answer; and
transmitting, over a network connection, the priming message and the authentication query to the user associated with the device, wherein the priming message is configured to prompt the user via the device for the correct answer to the authentication query.

18. The non-transitory machine-readable medium of claim 17, wherein the information retrieved includes historical information associated with the user of the device.

19. The non-transitory machine-readable medium of claim 17, wherein the priming message further includes a communication designed to cause the user to make an association with the past event that identifies the correct answer based on content provided in the priming message for the event information.

20. The non-transitory machine-readable medium of claim 19, wherein the priming message includes a video or image designed to cause the user to make the association in the authentication query transmitted.

* * * * *